United States Patent
Ohashi et al.

(10) Patent No.: US 8,384,255 B2
(45) Date of Patent: Feb. 26, 2013

(54) SUPERCONDUCTING ROTATING ELECTRICAL MACHINE

(75) Inventors: Yoshimasa Ohashi, Kariya (JP); Nobuo Okumura, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 325 days.

(21) Appl. No.: 12/877,401

(22) Filed: Sep. 8, 2010

(65) Prior Publication Data

US 2011/0062806 A1    Mar. 17, 2011

(30) Foreign Application Priority Data

Sep. 17, 2009   (JP) ................................. 2009-215282

(51) Int. Cl.
*H02K 9/00* (2006.01)
(52) U.S. Cl. ........................................... 310/54; 310/52
(58) Field of Classification Search .................. 310/90.5, 310/52, 54, 55, 57, 58, 86; 505/166
See application file for complete search history.

(56) References Cited

U.S. PATENT DOCUMENTS

| | | | | |
|---|---|---|---|---|
| 4,808,864 A * | 2/1989 | Brunet et al. | .................... | 310/52 |
| 4,862,023 A * | 8/1989 | Laumond et al. | ............... | 310/54 |
| 6,536,218 B1 * | 3/2003 | Steinmeyer | .......................... | 62/6 |
| 6,777,841 B2 * | 8/2004 | Steinmeyer | .................. | 310/90.5 |
| 2004/0021382 A1 * | 2/2004 | Steinmeyer | .................. | 310/90.5 |
| 2004/0245865 A1 * | 12/2004 | Ries | ............................... | 310/52 |

FOREIGN PATENT DOCUMENTS

| | | |
|---|---|---|
| JP | 2004-23921 | 1/2004 |
| JP | 2006-149007 | 6/2006 |

* cited by examiner

*Primary Examiner* — Dang Le
(74) *Attorney, Agent, or Firm* — Oblon, Spivak, McClelland, Maier & Neustadt, L.L.P.

(57) ABSTRACT

A superconducting rotating electrical machine configuring a motor or generator, includes a base member, a stator supported by the base member, a rotor rotatably provided relative to the stator and including a superconducting material, a rotary shaft supporting the rotor, a cooling portion cooling the stator, a low temperature container forming an accommodating chamber accommodating the stator, the rotor, and a coolant, the accommodating chamber being arranged within the base member, a vacuum heat insulation chamber arranged at an outer side of the accommodating chamber and thermally insulating the accommodating chamber with vacuum, and a bearing positioned a portion of the base member where the accommodating chamber is prevented from being provided and which is exposed to an ambient atmosphere including atmospheric air, the bearing rotatably supporting the rotary shaft.

20 Claims, 8 Drawing Sheets

SUPERCONDUCTING ROTATING ELECTRICAL MACHINE

CROSS REFERENCE TO RELATED APPLICATIONS

This application is based on and claims priority under 35 U.S.C. §119 to Japanese Patent Application 2009-215282, filed on Sep. 17, 2009, the entire content of which is incorporated herein by reference.

TECHNICAL FIELD

This disclosure relates to a superconducting rotating electrical machine configuring a motor or generator.

BACKGROUND DISCUSSION

A known superconducting motor disclosed in JP2004-23921A (hereinafter referred to as Reference 1) includes a case forming a vacuum heat insulation chamber, an airtight container forming a gas cooling medium chamber arranged in the case, a stator arranged in the airtight container and generating a rotating magnetic field, a refrigerating device supported by the case and cooling the stator, a rotor formed by a superconducting bulk member rotatably arranged in the airtight container relative to the stator, a rotary shaft rotating along with the rotor, and bearings rotatably supporting the rotary shaft to the case. Since the rotor is formed by the superconducting bulk member, it is necessary for the rotor to be cooled to an extremely low temperature state that is equal to or lower than a critical temperature of the superconducting bulk member. Accordingly, the gas cooling medium is filled in the airtight container. Consequently, when the refrigerating device cools the stator within the airtight container, the gas cooling medium within the airtight container is cooled; therefore, the rotor within the airtight container is maintained in the extremely low temperature state due to thermal conduction by use of the gas cooling medium within the airtight container.

In the superconducting motor according to Reference 1, the bearings are arranged in the extremely low temperature state of the case (vacuum heat insulation chamber). Accordingly, a lubricating agent applied to the bearings is also cooled excessively to therefore deteriorate the durability of the bearing. Consequently, a smooth rotating operation of the rotary shaft may be deteriorated.

A known superconducting motor disclosed in JP2006-149007 (hereinafter referred to as Reference 2) includes a case forming a heat insulation chamber, a coolant chamber arranged in the case, a coolant inlet port through which a coolant cooled to an extremely low temperature state is supplied to the coolant chamber, a coolant outlet port through which the coolant is discharged from the coolant chamber, a stator yoke arranged in the coolant chamber and generating a rotating magnetic field, a rotor yoke having a superconducting coil rotatably arranged in the coolant chamber relative to the stator yoke, a rotary shaft rotating along with the rotor yoke, and bearings rotatably supporting the rotary shaft to the case. The coolant is, for example, liquid nitrogen, liquid hydrogen, and the like. Since the rotor yoke has the superconducting coil, it is necessary for the rotor yoke to be cooled to an extremely low temperature state that is equal to or lower than a critical temperature of the superconducting coil. Accordingly, the coolant cooled by a refrigerating device is supplied to the coolant chamber through the coolant inlet port and thereafter cools the stator yoke and the rotor yoke that are arranged in the coolant chamber. Then, the coolant is discharged from the coolant chamber through the coolant outlet port. Consequently, the rotor yoke having the superconducting coil in the coolant chamber is maintained in the extremely low temperature state. In the superconducting motor according to Reference 2, the bearings are arranged at the coolant chamber maintained in the extremely low temperature state so as to face each other. Accordingly, the bearings may be extremely cooled by the coolant. Further, a lubricating agent applied to the bearings may be cooled, therefore excessively increasing the viscosity of the lubricating agent. As a result, the durability of the bearings deteriorates; thereby, a smooth rotating operation of the rotary shaft may be deteriorated.

A need thus exists for a superconducting rotating electrical machine, which is not susceptible to the drawback mentioned above.

SUMMARY

According to an aspect of this disclosure, a superconducting rotating electrical machine configuring a motor or generator, includes a base member, a stator supported by the base member, a rotor rotatably provided relative to the stator and including a superconducting material, a rotary shaft supporting the rotor, a cooling portion cooling the stator, a low temperature container forming an accommodating chamber accommodating the stator, the rotor, and a coolant, the accommodating chamber being arranged within the base member, a vacuum heat insulation chamber arranged at an outer side of the accommodating chamber and thermally insulating the accommodating chamber with vacuum, and a bearing positioned a portion of the base member where the accommodating chamber is prevented from being provided and which is exposed to an ambient atmosphere including atmospheric air, the bearing rotatably supporting the rotary shaft.

According to another aspect of the disclosure, a superconducting rotating electrical machine configuring a motor or generator, includes a base member, a stator supported by the base member, a rotor rotatably provided relative to the stator and including a superconducting material, a rotary shaft supporting the rotor, a cooling portion cooling the stator, a low temperature container forming an accommodating chamber accommodating the stator, the rotor, and a cooling medium, a vacuum heat insulation chamber arranged at an outer side of the accommodating chamber and thermally insulating the accommodating chamber with vacuum, and a Ferrofluidic seal positioned between an outer circumferential portion of the rotary shaft and the base member.

According to a further aspect of the disclosure, a superconducting rotating electrical machine configuring a motor or generator, includes a base member, a stator supported by the base member, a rotor rotatably provided relative to the stator and including a superconducting material, a rotary shaft supporting the rotor, a cooling portion cooling the stator, a low temperature container forming an accommodating chamber accommodating the stator, the rotor, and a cooling medium, the accommodating chamber being arranged within the base member, a vacuum heat insulation chamber arranged at an outer side of the accommodating chamber and thermally insulating the accommodating chamber with vacuum, a bearing positioned at a portion of the base member where the accommodating chamber is prevented from being provided and which is exposed to an ambient atmosphere including atmospheric air, the bearing rotatably supporting the rotary shaft, and a Ferrofluidic seal positioned between an outer circumferential portion of the rotary shaft and the base member, the base member including facing walls facing each other and each having a shaft hole for the rotary shaft and positioned adjacent to the vacuum heat insulation chamber, wherein the Ferrofluidic seal is located next to the bearing between the accommodating chamber and the bearing and formed to be contact with both the vacuum heat insulation chamber and the facing wall.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A superconducting rotating electrical machine configures, for example, a motor or generator. The superconducting rotating electrical machine includes a base member, a stator supported by the base member, a rotor rotatably provided relative to the stator and formed by a superconducting material, a rotary shaft retaining the rotor, a low temperature container configuring an accommodating chamber, a vacuum heat insulation chamber arranged at an outer side of the accommodating chamber, and bearings at a portion of the base member where the accommodating chamber is prevented from being provided and which is exposed to an ambient atmosphere including atmospheric air. The accommodating chamber accommodates the stator, the rotor, and a coolant. The vacuum heat insulation chamber insulates the accommodating chamber with vacuum. The bearings rotatably support the rotary shaft.

In the case where the superconducting rotating electrical machine is the motor, the motor serves as an induction motor applying an induced current to the rotor. In this case, the rotor is, for example, a cage motor or a wound rotor. When the rotor is the cage motor, at least a portion of the cage motor is formed by a superconducting material. When the rotor is the wound rotor, a coil of the wound rotor is formed by a superconducting material. It is preferable for the stator to include a magnetic permeable core formed by a magnetic permeable material and a wound portion retained by the magnetic permeable core. The wound portion may be formed by a typical conductive material such as copper wire and the like or by a superconducting material. Further, in the case where the superconducting rotating electrical machine is the generator, a superconducting magnet and the like may be applied to the superconducting material of the rotor.

Figure 1:
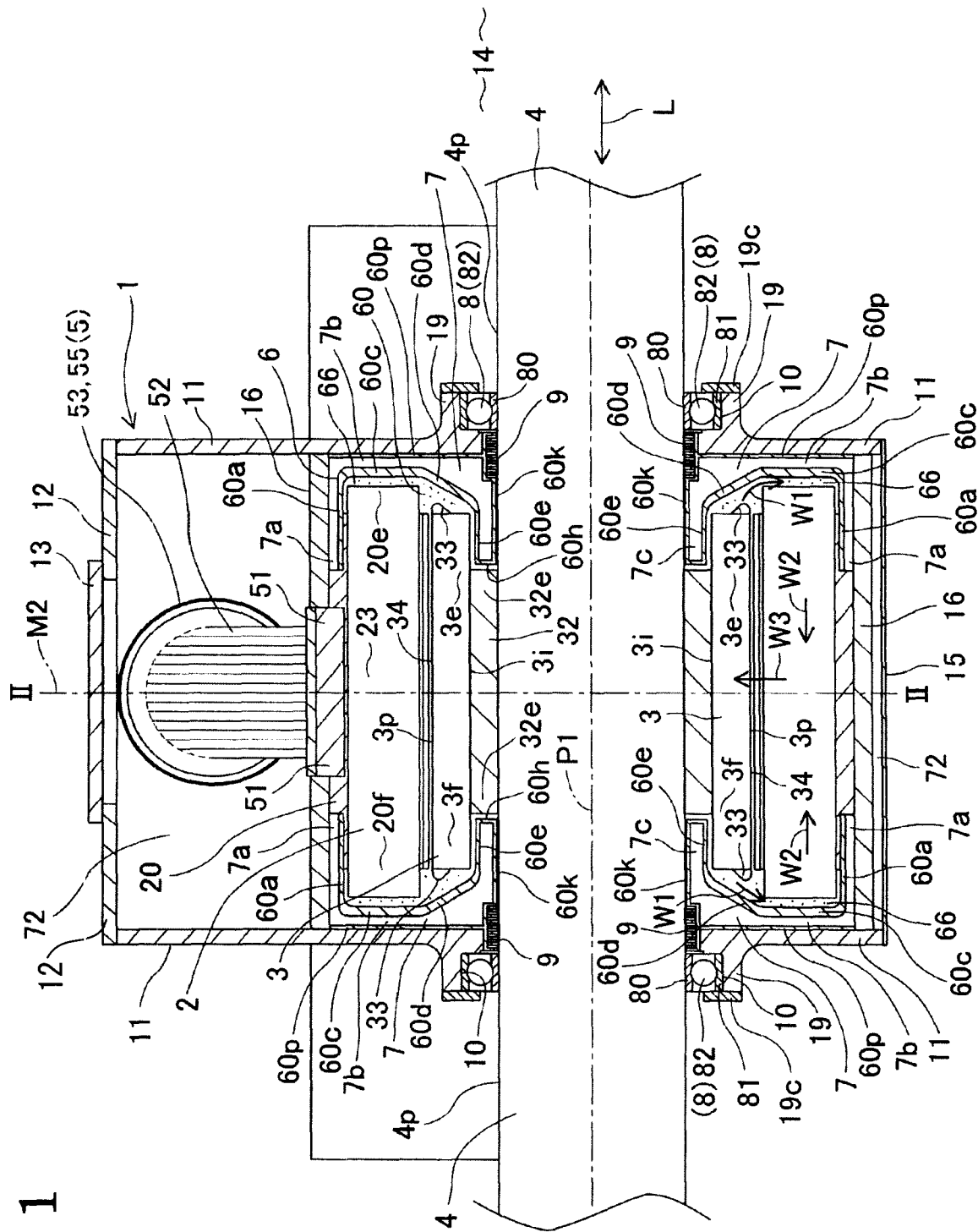
FIG. 1 is a cross-sectional view of a superconducting rotating electrical machine according to a first embodiment disclosed here, which is cut along an axial line of a rotary shaft.
Figure 2:
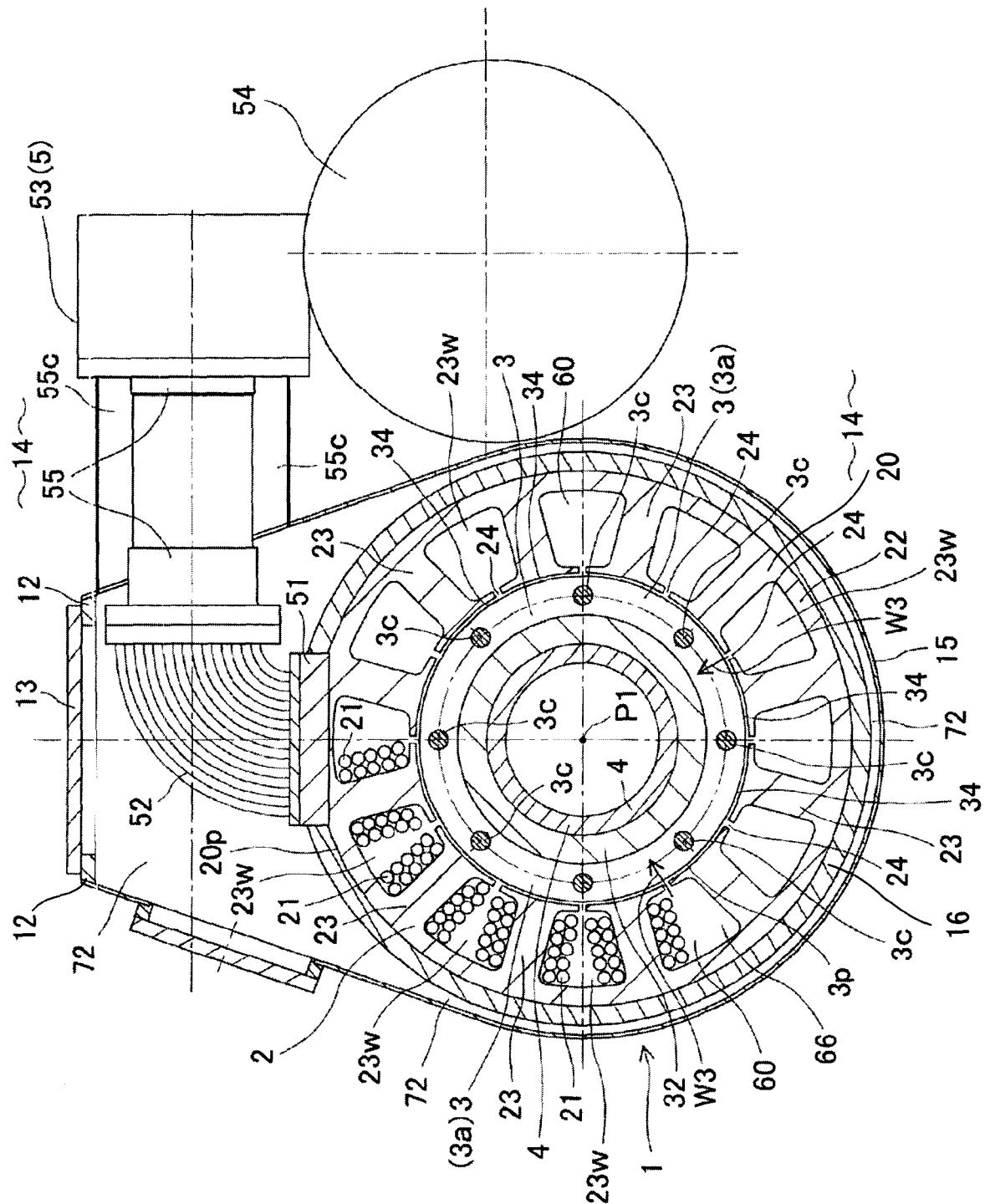
FIG. 2 is a cross-sectional view taken along the line II-II of FIG. 1 and illustrating the superconducting rotating electrical machine according to the first embodiment disclosed here, as seen from a direction perpendicular to the axial line of the rotary shaft.
Figure 3:
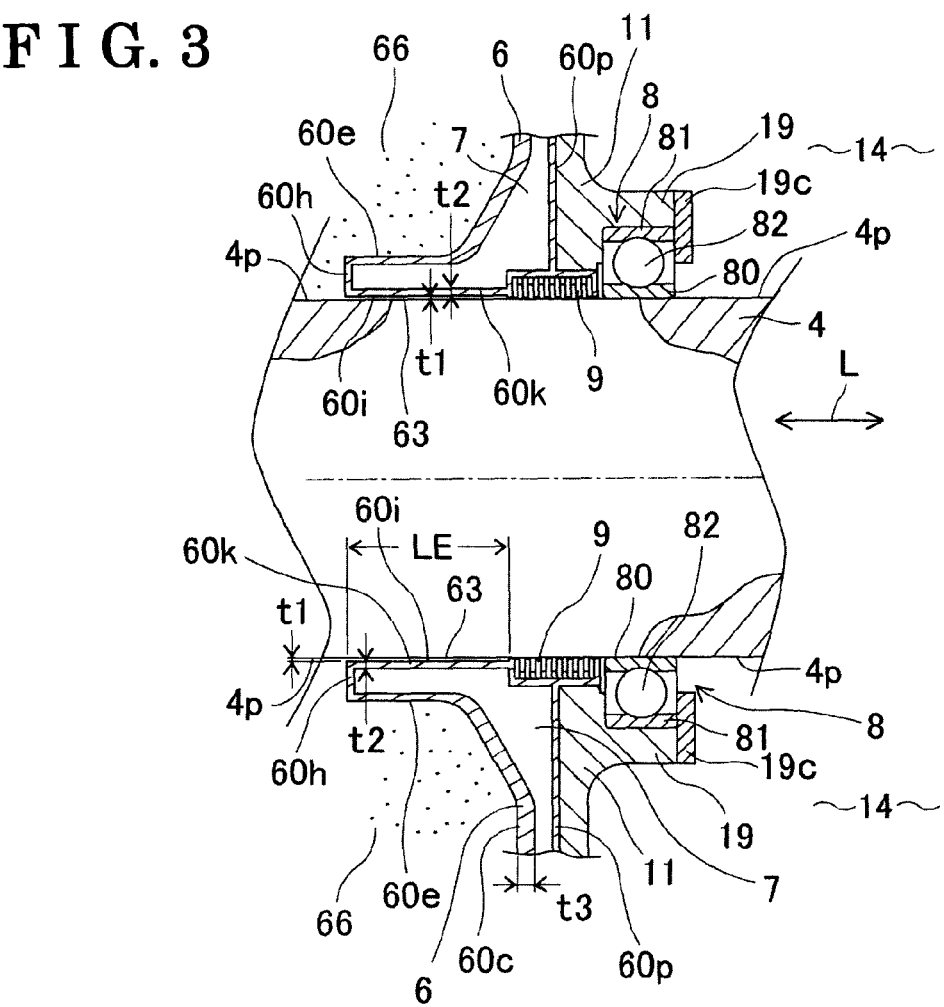
FIG. 3 is a cross-sectional view of an adjacent area of a Ferrofluidic seal of the superconducting rotating electrical machine according to the first embodiment shown in FIG. 1.

FIGS. 1 to 3 illustrate a concept of the superconducting rotating electrical machine according to a first embodiment. The first embodiment is an example where the superconducting rotating electrical machine is applied to a superconducting motor. As illustrated in FIG. 1, the superconducting motor includes a base member 1, a stator 2 generating a rotating magnetic field, a rotor 3 rotatably arranged relative to the stator 2, rotated by the rotating magnetic field of the stator 2, and formed by a superconducting material, a rotary shaft 4 retaining the rotor 3, a cooling portion 5 cooling the stator 2, a low temperature container 6 configuring an accommodating chamber 60, and a vacuum heat insulation chamber 7 arranged at an outer side of the accommodating chamber 60 and surrounding the accommodating chamber 60. The accommodating chamber 60 of the low temperature container 6 accommodates the stator 2, the rotor 3, and a gas cooling medium 66 (coolant). The accommodating chamber 60 is arranged within the base member 1.

As shown in FIG. 1, the base member 1 includes two facing walls 11, 11 facing each other and each having a shaft hole 10, connecting walls 12, 12 connecting outer circumferential end portions of the facing walls 11, 11, respectively, a contacting wall 13 contacting the connecting walls 12, 12, and a connecting wall 15 connecting the outer circumferential end portions of the facing walls 11, 11. An outer side of the base member 1 is maintained in an ambient atmosphere and will be referred to as an atmospheric portion 14. The atmospheric portion 14 is the ambient atmosphere generally formed by atmospheric air. It is desirable for the atmospheric portion 14 to be maintained at a room temperature or an approximate room temperature or to correspond to the ambient atmosphere under the room temperature. The approximate room temperature is in a temperature range that is close to the room temperature rather than to an extremely low temperature. The temperature range of the approximate room temperature may be set within a range from 0 to 40 degrees Celsius (plus or minus 20 degrees Celsius of 20 degrees Celsius), a range from 10 to 30 degrees Celsius (plus or minus 10 degrees Celsius of 20 degrees Celsius), and a range from 15 to 25 degrees Celsius (plus or minus 5 degrees Celsius of 20 degrees Celsius).

The base member 1 is formed by metal, FRP (fiber-reinforced plastic), or ceramics. Further, as shown in FIG. 1, the base member 1 includes a tubular attachment portion 16 arranged between the facing walls 11, 11 and a second vacuum heat insulation chamber 72 provided at an outer side of the tubular attachment portion 16. Furthermore, a material reducing the leakage of a magnetic flux and having strength is recommended as a material of the base member 1. For example, alloy steel (stainless steel) having a low permeability, hard resin, resin for a reinforcing material, and ceramics are applicable as the material of the base member 1. The reinforcing material is an inorganic fiber such as a glass fiber and a ceramic fiber; therefore, the fiber-reinforced plastic is applied in the first embodiment. The resin may be either a thermosetting resin or a thermoplastic resin. Here, when the material of the base member 1 is a metallic material, the gas cooling medium 66 as will be described below is prevented from leaking into the vacuum heat insulation chamber 7 because the metal has a high blocking effect relative to the gas cooling medium 66. Accordingly, a reduction of vacuum heat insulation efficiency of the vacuum heat insulation chamber 7 due to the leaking of the gas cooling medium 66 is prevented. Thus, the high vacuum heal insulation efficiency of the vacuum heat insulation chamber 7 is obtained. The base member 1 favorably includes the facing walls 11, 11, the connecting walls 12, 12, the contact wall 13, and the connecting wall 15 that are formed by the metallic material, and the tubular attachment portion 16 that is formed by the fiber-reinforced plastic. However, the material of the base member 1 is not limited to the metallic material and the fiber-reinforced plastic.

As illustrated in FIG. 2, the stator 2 is fixedly retained at an inner side of the tubular attachment portion 16. The stator 2 includes a magnetic permeable core 20 serving as a fixed iron core and wound portions 21 wound on the magnetic permeable core 20. The fixed iron core of the magnetic permeable core 20 is arranged around a central axis P1 of the rotary shaft 4 while having a tubular shape formed by a material that has a high permeability. Alternatively, the magnetic permeable core 20 may be formed by a laminated plate laminated on the rotary shaft 4 along the axial direction. Further, the magnetic permeable core 20 may be a consolidated aggregation of a number of iron powder particles covered by insulating coating. The magnetic permeable core 20 includes a ring portion 22 arranged to surround the central axis P1 and tooth portions 23, which extend from the ring portion 22 to the central axis P1. The wound portions 21 are positioned in throttle grooves 23w formed between the tooth portions 23. Each of the wound portions 21 is formed by a superconducting material or a copper winding wire that is wound on each of the tooth portions 23 while generating the rotating magnetic field around the central axis P1 in each of positive and negative rotating directions. When being cooled to an extremely low temperature state that is equal to or lower than a critical temperature of the superconducting material, the superconducting material is brought into a superconducting state to therefore drastically reduce electrical resistance. The critical temperature depends on superconducting materials. For example, the critical temperature is set between 4K and 100K. FIG. 2 shows only a partial portion of the wound portions 21 wound around the teeth portions 23 and does not illustrate an entire portion of the wound portions 21 wound around the teeth portions 23. The wound portions 21 are not illustrated in FIG. 1 in order to prevent FIG. 1 from being unclear. Further, the stator 2 and the rotor 3 are simply illustrated in FIG. 1 in order to prevent FIG. 1 from being unclear.

The rotor 3 is rotatably arranged relative to the stator 2 so as be surrounded thereby. The rotor 3 is rotated by the rotating magnetic field of the stator 2 around the central axis P1. Further, the rotor 3 is formed by the superconducting material and brought into the superconductive state when being cooled to the extremely low temperature or lower. The superconducting motor according to the first embodiment is a cage induction motor. Accordingly, as seen from FIG. 2, the rotor 3 includes axial end plates 3a arranged at both axial ends of the rotor 3 in the axial direction and a plurality of rod-shaped members 3c connecting the axial ends of the rotor 3 and circumferentially positioned at intervals from one another. The rod-shaped members 3c have electrical conductivity. The axial end plates 3a and the rod-shaped members 3c are formed by a superconducting material that reduces electrical resistance drastically or that decreases the electrical resistance to zero. Here, when the rotating magnetic field is generated by the stator 2 around the central axis P1, an induced current is applied to the rod-shaped members 3 and the like of the rotor 3 due to electromagnetic induction. Then, when the rotor 3 is electromagnetically induced, the rotor 3 is rotated about the central axis P1 in the positive or negative rotating direction in accordance with a relation between the induced current and the stator 2.

The rotor 3 is formed in a tubular cage around the central axis P1 while circumferentially including a plurality of pass-through opening portions (see FIG. 2). The rotary shaft 4 retains an inner circumferential portion 3i of the rotor 3 by means of a fitting portion 32 while being positioned approximately coaxially with the rotor 3. The fitting portion 32 has a tubular or ring shape. The rotor 3 is retained to an outer circumferential portion 4p of the rotary shaft 4 by the fitting portion 32. The rotary shaft 4 is positioned so as to be rotatable in the atmospheric portion 14 maintained at the room temperature or the approximate room temperature. Further, the rotary shaft 4 has a solid shape in the first embodiment. Alternatively, the rotary shaft 4 may be formed into a hollow cylinder. Any of metal, ceramics, and FRP (fiber-reinforced plastic) is applicable as a material of the rotary shaft 4. In particular, the FRP having a low thermal conductivity is recommended.

The cooling portion 5 forcibly cools the stator 2 to the extremely low temperature state and eventually cools the gas cooling medium 66 and the rotor 3 in the accommodating chamber 60 via the stator 2 to a critical temperature or lower (extremely low temperature state) of the rotor 3. As illustrated in FIG. 2, the cooling portion 5 includes a first thermal conductor 51, a refrigerating device 53 arranged at the base member 1, a compressor 54 activating the refrigerating device 53, a cold head 55 cooled by the refrigerating device 53 to the extremely low temperature state, and a second thermal conductor 52 connecting the cold head 55 to the first thermal conductor 51. The first thermal conductor 51 makes thermal contact with a portion of an outer circumferential portion 20p of the magnetic permeable core 20 of the stator 2. The refrigerating device 53 is a known refrigerating device such as a pulse tube refrigerator, Stirling refrigerator, Gifford-McMahon refrigerator, Solvey refrigerator, and Vuilleumier refrigerator. The second thermal conductor 52 is arranged in the second vacuum heat isolation chamber 72 and configured, for example, by a mesh, plate, or rod member that is formed by a metallic material having a high thermal conductivity. A space around the cold head 55 is a vacuum heat insulation portion 55c so that high heat insulation efficiency may be maintained.

As illustrated in FIG. 2, the low temperature container 6 forms the accommodating chamber 60 accommodating the stator 2 and the rotor 3. The rotor 3 is arranged radially inward from an inner circumferential portion of the stator 2 in the accommodating chamber 60. The gas cooling medium 66 serving as the coolant is filled in the accommodating chamber 60 so as to be accommodated therein. Gas that does not solidify and condense at a temperature that is the critical temperature or lower of the superconducting material, or at an operating temperature of the superconducting rotating electrical machine, is selected as the gas cooling medium 66. The gas is, for example, helium, nitrogen, hydrogen, neon, and the like. The low temperature container 6 is formed by a metallic material such as carbon steel, stainless steel, aluminum alloy, and titanium alloy, therefore having a high blocking effect relative to the gas cooling medium 66 and preventing the gas cooling medium coolant 66 in the accommodating chamber 60 from leaking to the outer side of the accommodating chamber 60 (to the vacuum heat isolation chamber 7). Consequently, the vacuum heat isolation chamber 7 may be maintained in a high vacuum state for a long period of time.

As shown in FIG. 1, the low temperature container 6 is formed in a shell while including outer circumferential walls 60a, 60a, covering walls 60c, 60c, and inclined walls 60d, 60d. Each of the outer circumferential walls 60a, 60a is arranged at the outer circumferential portion 20p of the magnetic permeable core 20 so as to surround the central axis P1. The covering walls 60c, 60c cover a first end portion 20e and a second end portion 20f, respectively, of the magnetic permeable core 20 in the axial direction of the rotary shaft 4. Each of the inclined walls 60d, 60d is formed in a circular cone extending radially inward from each of the covering walls 60c, 60c. The inclined wall 60d is inclined relative to the central axis P1 so as to guide the gas cooling medium 66 radially outward. The low temperature container 6 made of metal further includes extending walls 60e, 60e, axial end walls 60h, 60h, and tubular sealing portions 60k, 60k. Each of the extending walls 60e, 60e is formed at an inner end portion of the inclined wall 60d so as to extend therefrom along the inner circumferential portion 3i of the rotor 3. The axial end walls 60h, 60h face respective axial ends 32e of the fitting portion 32 in the axial direction of the rotary shaft 4. Each of the tubular sealing portions 60k, 60k is formed at an inner end portion of each of the axial end walls 60h, 60h so as to extend therefrom along the outer circumferential portion 4p of the rotary shaft 4. An internal diameter of the tubular sealing portion 60k is substantially uniform in the axial direction of the rotary shaft 4. As illustrated in FIG. 1, the low temperature container 6 further includes extending walls 60p, 60p each extending radially outwardly from an end portion of the tubular sealing portion 60k. Each of the extending walls 60p, 60p is arranged adjacent to an inner surface of the facing wall 11 while facing the covering wall 60c and the inclined wall 60d, thereby separating the vacuum heat insulation chamber 7 from the base member 1. The vacuum heat insulation chamber 7 is divided by the low temperature container 6 having the aforementioned shape and configuration, into two sections at right and left sides in a direction indicated by an arrow L shown in FIG. 1.

As illustrated in FIG. 3, the tubular sealing portion 60k facing the outer circumferential portion 4p of the rotary shaft 4 in a condition where a clearance 63 is defined between the tubular sealing portion 60k and the outer circumferential portion 4p in the axial direction of the rotary shaft 4. Further, the tubular sealing portion 60k is formed into a hollow right-cylindrical shape approximately coaxial with the rotary shaft 4 and extending in the axial direction (a direction indicated by an arrow L shown in FIG. 3). A width t1 of the clearance 63 between the tubular sealing portion 60k and the outer circumferential portion 4p may be set to range from 50 micrometers to 1,200 micrometers, from 100 micrometers to 1,100 micrometers, and from 200 micrometers to 1,000 micrometers; however, the width t1 is not limited to such ranges.

As shown in FIG. 1, the tubular sealing portions 60k, 60k are formed so as to further extend toward a central portion of the inner circumferential portion 3i in the axial direction (a direction indicated by an arrow L shown in FIG. 3) than first and second axial ends 3e and 3f of the rotor 3. Further, the tubular sealing portions 60k, 60k are positioned adjacent to the axial ends 32e of the fitting portion 32, respectively, of the magnetic permeable core 20 in the axial direction. Accordingly, an axial length LE (see FIG. 3) of each of the tubular sealing portions 60k, 60k is secured, therefore increasing a sealing performance of the tubular sealing portions 60k, 60k. As a result, the gas cooling medium 66 in the accommodating chamber 60 is further restricted from leaking therefrom to the vacuum heat insulation chamber 7 and the atmospheric portion 14. In addition, the atmospheric air of the atmospheric portion 14 is prevented from flowing to the accommodating chamber 60.

As illustrated in FIG. 1, the vacuum heat insulation chamber 7 is arranged at the outer side of the accommodating chamber 60 so as to surround the accommodating chamber 60 filled with the gas cooling medium 66. The vacuum heat insulation chamber 7 thermally insulates the accommodating chamber 60 with vacuum to thereby maintain the accommodating chamber 60 in a low temperature state that is closer to the extremely low temperature and the like. The vacuum heat insulation chamber 7 is provided between the atmospheric portion 14 and the accommodating chamber 60 and thereby isolates the atmospheric portion 14 and the accommodating chamber 60 from each other. Further, as shown in FIG. 1, the vacuum heat insulation chamber 7 includes an outer-circumferential heat insulation chamber 7a, an axial-end heat insulation chamber 7b, and an inner-side heat insulation chamber 7c. The outer-circumferential heat insulation chamber 7a covers the outer circumferential portion 20p of the stator 2. The axial-end heat insulation chamber 7b covers an outer side of the first and second axial ends 20e and 20f of the stator 2 and an outer side of the first and second axial ends 3e and 3f of the rotor 3. The inner-side heat insulation chamber 7c covers portions located in the vicinity of the first and second axial ends 3e and 3f at the inner circumferential portion 3i of the rotor 3. Thus, a thermal contactability of the gas cooling medium 66 with the stator 2 and the rotor 3 is secured; therefore, a forcible cooling by using the gas cooling medium 66 is performed. Viscosity of the gas cooling medium 66 is relatively low compared to viscosity of a liquid coolant. Accordingly, a rotary performance of the rotor 3 is not deteriorated.

The superconducting motor according to the first embodiment includes bearings 8 rotatably supporting the rotary shaft 4 around the central axis P1. As shown in FIG. 1, the bearings 8 each having a ring shape are positioned at a portion of the base member 1 where the accommodating chamber 60 is prevented from being provided and which is exposed to the ambient atmosphere including the atmospheric air. Further, the bearings 8 are arranged at the outer circumferential portion 4p of the rotary shaft 4 so as to face the atmospheric portion 14, that is, the bearings 8 are exposed to the atmospheric air at the room temperature or the approximate room temperature. Furthermore, the bearings 8 are provided at the right and left sides in the axial direction (direction indicated by the arrow L shown in FIG. 1), therefore preventing the rotor 3 from being misaligned around the central axis P1 and desirably maintaining the rotary performance of the rotor 3. Accordingly, even in the case where the width t1 of the clearance 63 is small, variations of the width t1 in a circumferential direction of the rotary shaft 4 are minimized. As a result, the width t1 may be designed at a small value. Thus, a plurality of bearings 8 increases coaxiality between the stator 2 and the rotor 3.

As illustrated in FIG. 1 and FIG. 3, each of the bearings 8 includes an inner race 80 having a ring shape, an outer race 81 having a ring shape, and rolling elements 82. A plurality of rolling elements 82 is circumferentially arranged at intervals from one another between the inner race 80 and the outer race 81. The inner race 80, the outer race 81, and the rolling elements 82 are formed by metal, ceramic, or hard resin. A flanged attachment tube 19 having a tubular shape is formed at the facing wall 11 of the base member 1 so as to be positioned in the vicinity of the rolling elements 82. The outer race 81 of the bearing 8 is supported by an inner circumferential surface of the flanged attachment tube 19. The inner race 80 is supported by the outer circumferential portion 4p of the rotary shaft 4. A stopper portion 19c for the outer race 81 is attached to the flanged attachment tube 19, thereby maintaining a supporting performance of the bearing 8 for a long period of time and securing coaxiality of the rotary shaft 4 with the rotor 3 and the stator 2. In addition, as shown in FIG. 1, the stator 2, the rotor 3, and the low temperature container 6 are symmetrically arranged via an imaginary line M2 that is perpendicular to the central axis P1 of the rotary shaft 4.

As shown in FIG. 1, Ferrofluidic seals 9 serving as seal portions preventing the gas cooling medium 66 in the accommodating chamber 60 from leaking therefrom are positioned on the outer circumferential portion 4p of the rotary shaft 4 so as to face the outer circumferential portion 4p. The Ferrofluidic seals 9 each having a ring shape around the central axis P1 are arranged approximately coaxially with the central axis P1. The accommodating chamber 60 is isolated from the atmospheric portion 14 by the Ferrofluidic seals 9, therefore preventing the gas cooling medium 66 filled in the accommodating chamber 60, from leaking therefrom to the atmospheric portion 14. The Ferrofluidic seals 9 face the atmospheric portion 14 via the bearings 8 and therefore are maintained in the room temperature or the approximate room temperature. Each of the Ferrofluidic seals 9 includes a plurality of magnetic poles (positive and negative poles) and a magnetic fluid increasing a sealing performance between the outer circumferential portion 4p of the rotary shaft 4 and the magnetic poles. The plurality of magnetic poles each having a ring shape is arranged next to one another along the axial direction of the rotary shaft 4. The magnetic fluid is oriented along magnetic paths formed by the magnetic poles. The magnetic fluid includes a base fluid in which fine magnetic particles are stably dispersed with a surface-active agent. It is appropriate for the Ferrofluidic seal 9 to be maintained in the approximate room temperature in order to prevent the magnetic fluid from freezing. When the magnetic fluid freezes to therefore increase the viscosity, a rotational resistance of the rotary shaft 4 increases. In addition, as shown in FIG. 1 and FIG. 3, the Ferrofluidic seals 9 face the outer circumferential portion 4p of the rotary shaft 4 while being supported by the tubular sealing portions 60k, 60k, the extending walls 60p, 60p, and the facing walls 11, 11. Accordingly, heat transmission from the facing wall 11 and the rotary shaft 4 to the Ferrofluidic seal 9 is expected to therefore prevent the Ferrofluidic seal 9 from being excessively cooled.

As illustrated in FIG. 1, the Ferrofluidic seal 9 is arranged between the accommodating chamber 60 and the baring 8 in the axial direction (direction indicated by the arrow L shown in FIG. 1) of the rotary shaft 4. That is, the Ferrofluidic seal 9 is positioned between the vacuum heat insulation chamber 7 and the bearing 8. In other words, a plurality of Ferrofluidic seals 9 (two Ferrofluidic seals 9) is arranged so as to be separated by a space therebetween in the axial direction of the rotary shaft 4 and to be positioned at a further interior side of the base member 1 than the bearings 8 in the axial direction (to be positioned closer to the accommodating chamber 60 than the bearings 8 in the axial direction). The Ferrofluidic seal 9 has high air tightness and sealing performance and therefore prevents the gas cooling medium 66 in the accommodating chamber 60 from leaking therefrom even when the gas cooling medium 66 is a coolant such as helium gas and oxygen gas including small molecules. Accordingly, the vacuum heat insulation chamber 7 is appropriately maintained in a vacuum heat insulation state for a long period of time and the gas cooling medium 66 is sufficiently secured in the accommodating chamber 60 for a long period of time. In addition, the Ferrofluidic seal 9 is arranged to be contact with both an inner circumferential portion of the shaft hole 10 formed in the facing wall 11 of the base member 1, and the vacuum heat insulation chamber 7 in the axial direction of the rotary shaft 4 as shown in FIG. 1. Accordingly, the heat transmission from the facing wall 11 exposed to the atmospheric air, to the Ferrofluidic seal 9 is expected.

As shown in FIG. 1, a plurality of wing portions 33 (included in a wing mechanism) are formed at the first and second axial ends 3e and 3f of the rotor 3 so as to be positioned in the accommodating chamber 60. Each of the wing portions 33 has a fan shape. The wing portion 33 may be provided in a different position from the first and second axial ends 3e and 3f according to need. The wing portions 33 are rotated along with the rotor 3 around the central axis P1; thereby, the gas cooling medium 66 in the accommodating chamber 60 is shifted and circulated therein by a centrifugal force. As a result, the gas cooling medium 66 is shifted in a radially outward direction indicated by an arrow W1 shown in FIG. 1 and in a direction indicated by an arrow W2 shown in FIG. 1 by means of the centrifugal force and circulated from the first and second axial ends 20e and 20f to an central area of the stator 2 in the axial direction. Then, the gas cooling medium 66 is circulated from an opening portion 24 of the throttle groove 23w formed between the tooth portions 23 (see FIG. 2) along a radial direction (direction indicated by an arrow W3 shown in FIG. 2 and FIG. 3) to the rotor 3 and thereafter comes in contact with the rotor 3 so as to cool the rotor 3. In addition, a small gap 34 is defined between the outer circumferential portion 3p of the rotor 3 and the stator 2 as shown in FIG. 1. The gap 34 having a ring shape allows the rotor 3 to smoothly rotate.

As illustrated in FIG. 1, the wing portion 33 is arranged so as to face the inclined wall 60d of the low temperature container 6. Accordingly, the gas cooling medium 66 shifted by the wing portion 33 comes into contact with the inclined wall 60d and therefore is easily guided in the radially outward direction (indicated by the arrow W1 shown in FIG. 1). As a result, the gas cooling medium 66 appropriately comes into contact with the stator 2 that is located in a radially outward direction of the outer circumferential portion 3p of the rotor 3. Additionally, the gas cooling medium 66 is effectively cooled by the stator 2 that is forcibly cooled by the first thermal conductor 51.

For example, when the superconducting motor is in operation, a three-phase or single-phase alternating current is applied to the wound portions 21 of the stator 2 via an inverter. Accordingly, the rotating magnetic field is generated around the central axis P1, thereby rotating the rotor 3 along with the rotary shaft 4 and the wing portions 33 around the central axis P1 in the positive or negative rotating direction. Further, when the superconducting motor is in operation, the refrigerating device 53 is driven to cool the cold head 55. As a result, the cold head 55, the second thermal conductor 52, and the first thermal conductor 51 are cooled. Then, the magnetic permeable core 20 and the wound portions 21 that constitute portions of the stator 2 are cooled by the first thermal conductor 51. At this time, the wing portions 33 are rotated along with the rotation of the rotor 3 around the central axis P1, thereby circulating the gas cooling medium 66 in the accommodating chamber 60. Consequently, the gas cooling medium 66 comes in contact with the stator 2 and therefore is cooled by heat exchange. Then, the gas cooling medium 66 comes into contact with the rotor 3 to thereby forcibly cool the rotor 3, therefore further cooling the rotor 3. As a result, the superconducting material forming the rotor 3 may be maintained in the extremely low temperature state that is the critical temperature or lower and the superconducting state of the superconducting material may be maintained; thereby, the electrical resistance of the rotor 3 is reduced to zero and a high density of the induced current applied to the rotor 3 is secured. Thus, torque for rotating the rotor 3 is obtained to increase effectiveness of the superconducting motor accordingly.

As described above, according to the first embodiment, the rotor 3 formed by the superconducting material is accommodated in the accommodating chamber 60. Further, the accommodating chamber 60 is maintained in the low temperature state such as the extremely lower temperature state that is equal to or lower than the critical temperature of the superconducting material, in order to maintain the superconducting state of the superconducting material. Moreover, according to the first embodiment, the bearings 8 rotatably supporting the rotary shaft 4 are positioned at a portion of the base member 1 where the accommodating chamber 60 is prevented from being provided and which is exposed to the ambient atmosphere including the atmospheric air (to the atmospheric portion 14). In particular, each of the bearing 8 supporting the rotary shaft 4 is arranged between the facing wall 11 of the base member 1 and the outer circumferential portion 4p of the rotary shaft 4 so as to face the atmospheric portion 14. Accordingly, the bearing 8 is maintained in a high temperature range (corresponding to the room temperature or the approximate room temperature), which is at a temperature higher than the low temperature state such as the extremely lower temperature state. Thus, a lubricating agent applied to the bearing 8 is prevented from being excessively cooled and the viscosity of the lubricating agent is inhibited from excessively increasing. As a result, the rotary shaft 4 may be appropriately supported by the bearings 8 so as to be rotatable for a long period of time.

For example, when the bearings 8 are arranged so as to face the accommodating chamber 60 that is maintained in the low temperature state as in Reference 1 and Reference 2, the bearings 8 may be easily cooled to the low temperature state such as the extremely low temperature state. In such case, the viscosity of the lubricating agent applied to the bearings 8 may excessively increase, or the lubricating agent may freeze. As a result, the durability of the bearings 8 is drastically reduced. Further, the vacuum heat insulation chamber 7 may be contaminated with the lubricating agent to therefore deteriorate the heat insulation efficiency of the vacuum heat insulation chamber 7. According to the first embodiment, since the bearings 8 are arranged at a portion of the base member 1 where the accommodating chamber 60 is prevented from being provided and which is exposed to the ambient atmosphere including the atmospheric air, the aforementioned adverse conditions seen in Reference 1 and Reference 2 are prevented.

Moreover, for example, when the bearings 8 are arranged in the vacuum heat insulation chamber 7, the lubricating agent applied to the bearings 8 may evaporate. According to the first embodiment, the bearings 8 are arranged at a portion of the base member 1 where the accommodating chamber 60 is prevented from being provided and which is exposed to the ambient atmosphere including the atmospheric air, that is, each of the bearings 8 is arranged between the outer circumferential portion 4p of the rotary shaft 4 and the facing wall 11 of the base portion 1 so as to face the atmospheric portion 14. Accordingly, the lubricating agent applied to the bearing 8 may be prevented from evaporating; therefore, the rotary shaft 4 may be appropriately rotatably supported by the bearings 8 for a long period of time. Furthermore, the deterioration of the heat insulation efficiency of the vacuum heat insulation chamber 7 caused by the contamination by the lubricating agent is prevented.

In addition, according to the first embodiment, the width t1 of the clearance 63 defined between the tubular sealing portion 60k and the outer circumferential portion 4p is small; therefore, the sealing performance between an inner circumferential portion 60i of the tubular sealing portion 60k and the outer circumferential portion 4p of the rotary shaft 4 is appropriately secured while the rotary performance of the rotary shaft 4 is secured. Further, the tubular sealing portion 60k is positioned approximately coaxially with the rotary shaft 4 along the axial direction; therefore, the above sealing performance is further increased. Accordingly, the gas cooling medium 66 filled in the accommodating chamber 60 is prevented from leaking therefrom to the outer side of the accommodating chamber 60 and the atmospheric air of the atmospheric portion 14 is prevented from flowing in the accommodating chamber 60.

Meanwhile, for example, when the width t1 of the clearance 63 is large, the gas cooling medium 66 in the accommodating chamber 60 is prevented from leaking therefrom to an outer side of the Ferrofluidic seal 9; however, the gas cooling medium 66 flows into the clearance 63 that is located at a further inner side than the Ferrofluidic seal 9 in the direction indicated by the arrow L shown in FIG. 1 and FIG. 3; therefore, heat transmission such as heat convection caused by the gas cooling medium 66 in the clearance 63 is increased and external heat may be transmitted to the accommodating chamber 60. According to the first embodiment, the width t1 of the clearance 63 is small as described above. Accordingly, even when the gas cooling medium 66 in the accommodating chamber 60 flows into the clearance 63, the volume of the gas cooling member 66 flowing into the clearance 63 is extremely reduced. Consequently, the heat transmission such as the heat convection in the clearance 63 is prevented to inhibit the external heat from being transmitted to the accommodating chamber 60.

Additionally, a width t2 of the tubular sealing portion 60k is set to be smaller than a thickness t3 of the covering wall 60c (see FIG. 3). Accordingly, the transmission of the external heat from atmospheric portion 14 via the tubular seal portion 60k to the accommodating chamber 60 is further limited.

According to the first embodiment, the Ferrofluidic seal 9 is provided to the superconducting rotating electrical machine, therefore preventing the gas cooling medium 66 in the accommodating chamber 60 from leaking therefrom to the atmospheric portion 14. Further, an outer circumferential portion of the Ferrofluidic seal 9 is covered by the facing wall 11 of the base member 1; therefore, the heat transmission from the facing wall 11 to the Ferrofluidic seal 9 occurs. An inner circumferential portion of the Ferrofluidic seal 9 is circumferentially overlapped by the outer circumferential portion 4p of the rotary shaft 4. Accordingly, heat transmission from the rotary shaft 4 (that is positioned at a temperature higher than a temperature at which the Ferrofluidic seal 9 is positioned) to the Ferrofluidic seal 9 occurs. Furthermore, the Ferrofluidic seal 9 is located next to the bearing 8 in the direction indicated by the arrow L; thereby, heat transmission from the bearing 8 to the Ferrofluidic seal 9 occurs (the bearing 8 is positioned at a temperature higher than a temperature at which the Ferrofluidic seal 9 is positioned). Consequently, even when the accommodating chamber 6 accommodating the stator 2 and the rotor 3 that are formed by the superconducting material is maintained in the low temperature state corresponding to the extremely low temperature state, the Ferrofluidic seal 9 is prevented from being excessively cooled and the viscosity of the Ferrofluidic seal 9 is inhibited from excessively increasing. As a result, a lubricating property of the Ferrofluidic seal 9 and the sealing performance of the Ferrofluidic seal 9 are appropriately maintained for a long period of time. Additionally, the rotor 3 may smoothly and appropriately rotate for a long period of time.

According to the first embodiment, the plurality of rolling elements 82 is circumferentially arranged at intervals at the bearing 8; therefore, the bearing 8 has air permeability in the axial d reaction. Further, a main material of the bearing 8 is the metal that has a high thermal conductivity. Accordingly, the Ferrofluidic seal 9 may be affected by an ambient temperature in the vicinity of the bearing 8. Consequently, even when the accommodating chamber 60 is positioned in the low temperature state corresponding to the extremely low temperature state, the Ferrofluidic seal 9 is prevented from being extremely cooled.

As illustrated in FIG. 1, the Ferrofluidic seal 9 and the bearing 8 are arranged adjacent to each other (within a distance corresponding to an external diameter of the rotary shaft 4) so that the Ferrofluidic seal 9 is positioned at the further interior side than the bearing 8 in the axial direction (direction indicated by the arrow L). Here, the bearing 8 prevents the central axis P1 of the rotary shaft 4 from being misaligned in the axial direction when the rotary shaft 4 rotates. Since the Ferrofluidic seal 9 is arranged next to the bearing 8, the axial misalignment of the rotary shaft 4 is appropriately inhibited at the Ferrofluidic seal 9; therefore, the sealing performance of the Ferrofluidic seal 9 is further maintained appropriately for a long period of time.

Figure 4:
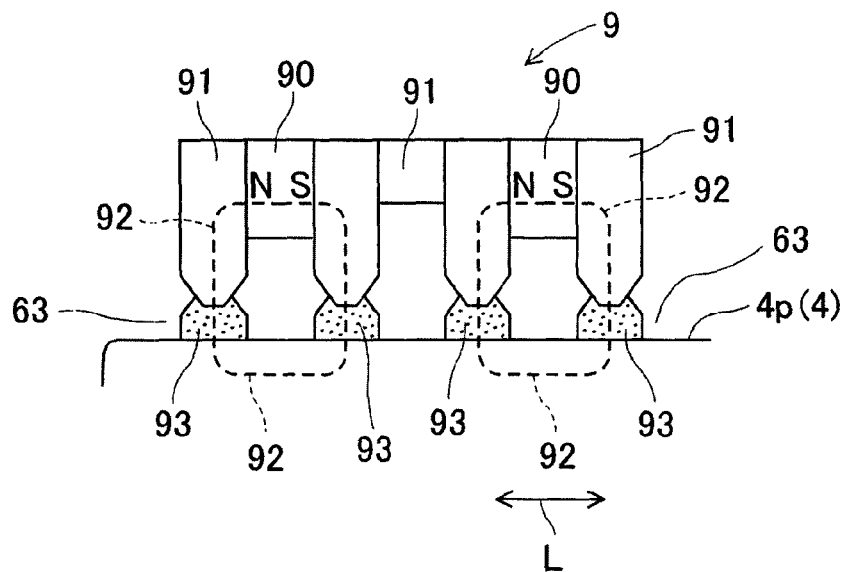
FIG. 4 is a perspective view of the Ferrofluidic seal of the superconducting rotating electrical machine according to a second embodiment disclosed here, cut along the axial line of the rotary shaft.

A second embodiment of the superconducting rotating electrical machine will be explained as follows with reference to FIG. 4. The second embodiment has substantially the same configuration and effects as the first embodiment. Differences from the first embodiment will be mainly described below. FIG. 4 illustrates an example of the Ferrofluidic seal 9. As shown in FIG. 4, the Ferrofluidic seal 9 includes magnet portions 90 having a plurality of magnetic poles (positive and negative poles), spacers 91 each arranged between the magnetic portions 90 arranged next to each other, and a magnetic fluid 93. The magnetic poles are arranged adjacent to each other in the axial direction corresponding to a direction indicated by an arrow L shown in FIG. 4. Each of the spacers 91 is formed by a non-magnetic or consistent magnetic material. The magnetic fluid 93 is arranged along magnetic paths 92 formed by the positive and negative poles. The magnetic fluid 93 increases the sealing performance of the Ferrofluidic seal 9 in the gap 63. It is favorable for the magnetic paths 92 to be separated from one another. Alternatively, the magnetic paths 92 may not be separated from one another. The magnetic fluid 93 is a fluid including a base fluid in which magnetic fine particles are maintained in a stably dispersed state by a surface-active agent. The base fluid is, for example, hydrocarbon fluid, fluorinated oil, and water; however, the base fluid is not limited to the aforementioned fluids.

Figure 5:
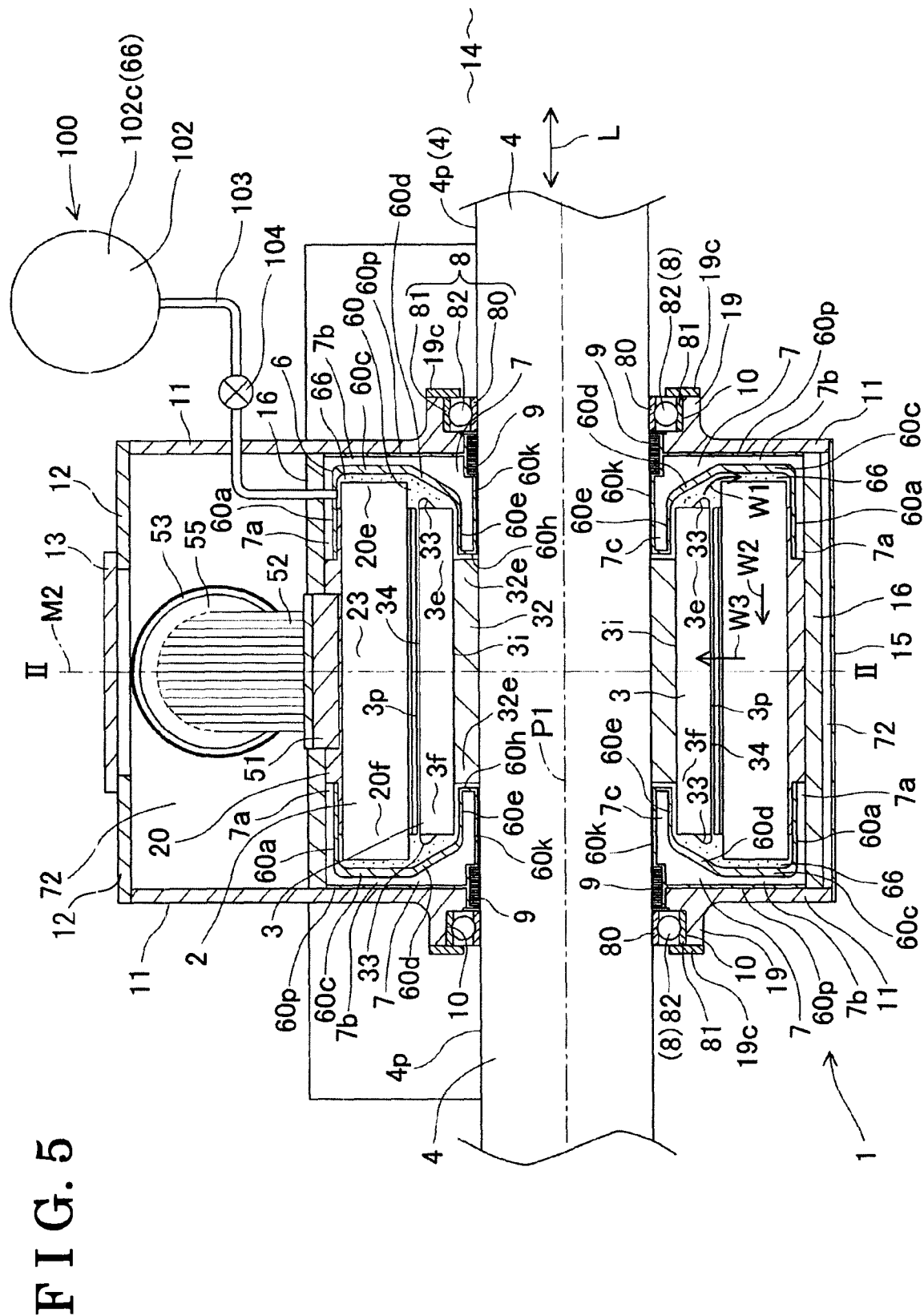
FIG. 5 is a cross-sectional view of the superconducting rotating electrical machine according to a third embodiment disclosed here, cut along the axial line of the rotary shaft.

A third embodiment of the superconducting rotating electrical machine will be explained as follows with reference to FIG. 5. The third embodiment has substantially the same configuration and effects as the first and second embodiments. Differences from the first and second embodiments will be mainly described below. As illustrated in FIG. 5, the superconducting motor is provided with a gas cooling medium charge-discharge portion 100 (coolant charge-discharge portion). The gas cooling medium charge-discharge portion 100 includes a buffer tank 102, a connecting passage 103, and a valve 104 arranged at the connecting passage 103. The buffer tank 102 is arranged at an outer side of the base member 1. The connecting passage 103 connects the buffer tank 102 to the accommodating chamber 60. The gas cooling medium charge-discharge portion 100 charges and discharges the gas cooling medium 66 to and from the accommodating chamber 60 depending on pressure variations of the gas cooling medium 66 in the accommodating chamber 60. When the superconducting motor is driven, a control device commands the compressor 54 to operate to thereby operate the refrigerating device 53. Then, the cold head 55 is cooled by the refrigerating device 53 to the extremely low temperature state and the stator 2 is cooled to the extremely low temperature state via the second thermal conductor 52 and the first thermal conductor 51. Consequently, the gas cooling medium 66 accommodated in the accommodating chamber 60 is cooled to the extremely low temperature. At this time, a pressure of the gas cooling medium 66 in the accommodating chamber 60 is decreased. For example, when the gas cooling medium 66 accommodated in the accommodating chamber 60 at the room temperature (300K) is cooled to 77K, the pressure of the gas cooling medium 66 is decreased to an approximately 25 percent (one fourth). Accordingly, the valve 104 is opened; thereby, the gas cooling medium 66 charged in a tank portion 102c of the buffer tank 102 under high pressure flows into the accommodating chamber 66 under low pressure in accordance with a pressure difference between the tank portion 102c and the accommodating chamber 60. As described above, when the superconducting motor is driven, the gas cooling medium 66 in the tank portion 102c of the buffer tank 102 is charged to the accommodating chamber 60, thereby increasing cooling capacity of the gas cooling medium 66 in the accommodating chamber 60 relative to the rotor 3.

Meanwhile, when the operation of the superconducting motor is stopped, the control device commands the compressor 54 to stop operating to stop the operation of the refrigerating device 53. Accordingly, the cooling capacity of the cold head 55 is decreased to therefore raise the temperature of the stator 2. Consequently, the temperature of the gas cooling medium 66 accommodated in the accommodating chamber 60 is raised, thereby increasing the cubic volume of the gas cooling medium 66. At this time, the pressure of the gas cooling medium 66 in the accommodating chamber 60 is increased. As a result, the valve 104 is opened; thereby, the gas cooling medium 66 in the accommodating chamber 60 under high pressure flows into the tank portion 102c of the buffer tank 102 under low pressure in accordance with the pressure difference between the tank portion 102c and the accommodating chamber 60. As described above, when the operation of the superconducting motor is stopped, the gas cooling medium 66 in the accommodating chamber 60 flows into the tank portion 102c of the buffer tank 102. Thus, the gas cooling medium charge-discharge portion 100 is utilized to charge the gas cooling medium 66 from the buffer tank 102 to the accommodating chamber 60 and to discharge the gas cooling medium 66 from the accommodating chamber 60 to the tank 102 depending on the temperature of the accommodating chamber 60 and depending on whether or not the superconducting motor is in operation. In addition, the buffer tank 102 may be arranged at an inner side of the base member 1 instead of the outer side of the base member 1 according to circumstances. For example, the buffer tank 102 may be arranged in the vacuum heat insulation chamber 7.

A fourth embodiment of the superconducting rotating electrical machine will be described below with reference to FIG. 6. The fourth embodiment has substantially the same configuration and effects as the aforementioned first, second, and third embodiments. Differences from the first, second, and third embodiments will be mainly described below. The rotary shaft 4 according to the fourth embodiment is formed in a hollow shaft while having a third vacuum heat insulation chamber 73 (rotary-shaft vacuum heat insulation chamber) and partition walls 43, 43. The third vacuum heat insulation chamber 73 is positioned so as to face the rotor 3 in the axial direction corresponding to a direction indicated by an arrow L shown in FIG. 6. The partition walls 43, 43 are arranged at an inner circumferential portion of the rotary shaft 4 so as to face each other thereat to section the inner circumferential portion, thereby defining the third vacuum heat insulation chamber 73. The third vacuum heat insulation chamber 73 forms an airtight space, which reaches a temperature range from the temperature of the accommodating chamber 60 to the temperature of the atmospheric portion 14. Further, the third vacuum heat insulation chamber 73 is arranged so as to overlap the rotor 3 and the accommodating chamber 60 in the axial direction, therefore having the advantage to prevent the external heat from being transmitted from the atmospheric portion 14 (at the room temperature) to the rotor 3 and the accommodating chamber 60 and to maintain the rotor 3 and the accommodating chamber 60 in the low temperature as much as possible. That is, as described above, since the third vacuum heat insulation chamber 73 that is the airtight space is formed at the inner circumferential portion of the rotary shaft 4, the external heat transferred from the atmospheric portion 14 (at the room temperature) to the rotary shaft 3 and the accommodating chamber 60 is limited.

Figure 6:
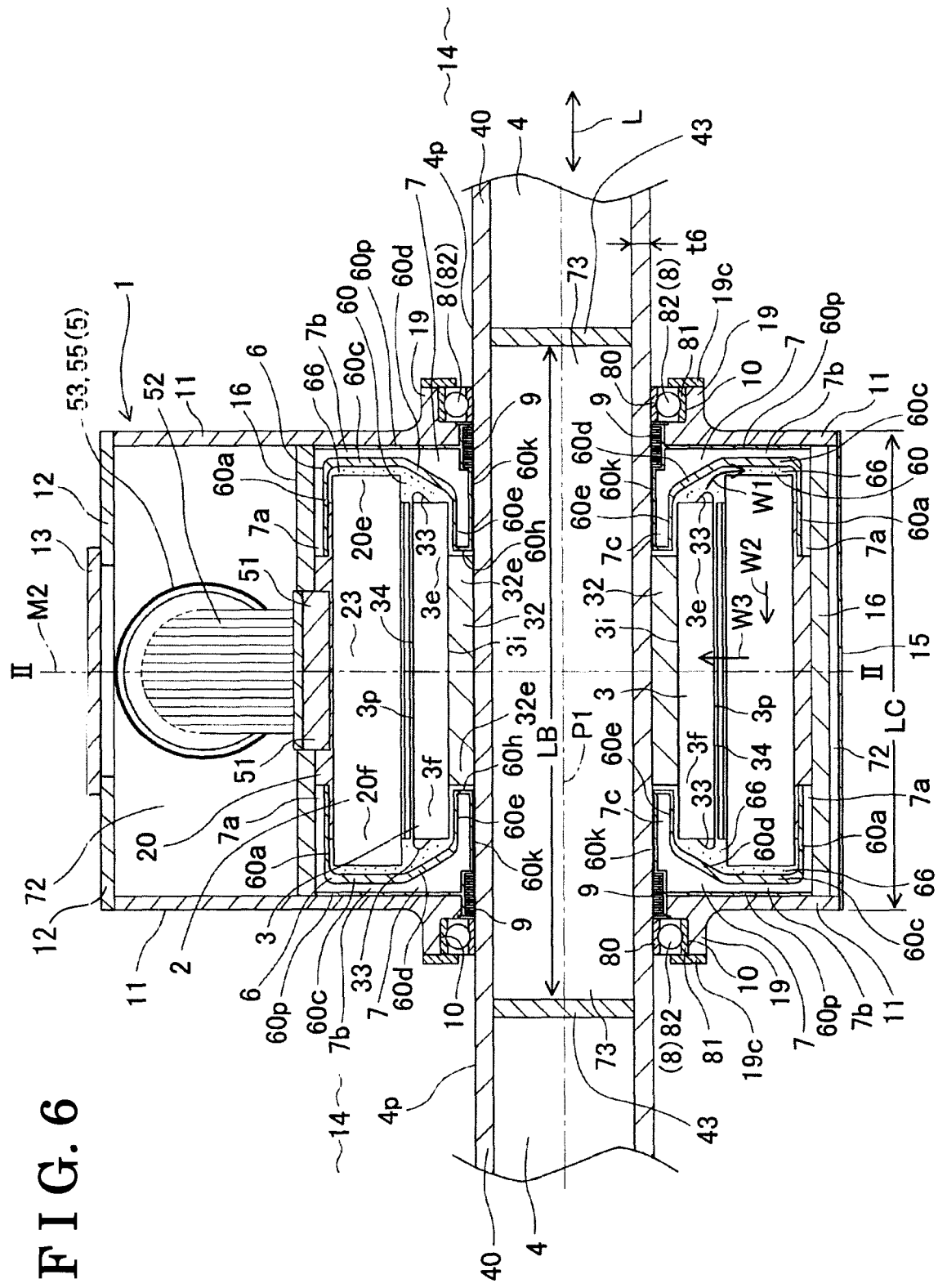
FIG. 6 is a cross-sectional view of the superconducting rotating electrical machine according to a fourth embodiment disclosed here, cut along the axial line of the rotary shaft.

Further, as illustrated in FIG. 6, an axial length LB of the third vacuum heat insulation chamber 73 in the axial length (direction indicted by an arrow L) is designed to be longer than an axial length LC of the base member 1 in the axial length. Accordingly, each of the partition walls 43, 43 is positioned at a further exterior side than the bearing 8 in the axial direction of the rotary shaft 4 (direction indicated by the arrow L). Thus, the external heat transferred from the atmospheric portion 14 to the rotor 3 and the accommodating chamber 60 via the rotary shaft 4 made of metal is limited. The Ferrofluidic seals 9 and the bearings 8 are supported by an outer circumferential wall 40 of the rotary shaft 4 maintained at the room temperature; thereby, the external heat is transferred from the outer circumferential wall 40 to the Ferrofluidic seals 9 and the bearings 8. Accordingly, even when the accommodating chamber 60 accommodating the rotor 3 that includes the superconducting material is maintained in the low temperature state corresponding to the extremely low temperature state, the Ferrofluidic seal 9 and the bearing 8 are prevented from being excessively cooled. Consequently, the outer circumferential wall 40 is preferably formed by a metallic material having an appropriate thermal conductivity and strength (for example, carbon steel, stainless steel, aluminum alloy, copper alloy, and the like). In addition, the outer circumferential wall 40 has a thickness t6 that is set at a predetermined value or more (see FIG. 6).

A fifth embodiment of the superconducting rotating electrical machine will be described as follows with reference to FIG. 7. The fifth embodiment has substantially the same configuration and effects as the aforementioned fourth embodiment. Differences from the fourth embodiment will be mainly described below. The rotary shaft 4 according to the fifth embodiment is formed to be the hollow shaft while having the third vacuum heat insulation chamber 73 and the partition walls 43, 43. The third vacuum heat insulation chamber 73 is positioned so as to face the rotor 3 in the axial direction corresponding to a direction indicated by an arrow L shown in FIG. 6. The partition walls 43, 43 are arranged at the inner circumferential portion of the rotary shaft 4 so as to face each other to section the inner circumferential portion, thereby defining the third vacuum heat insulation chamber 73. Since the third vacuum heat insulation chamber 73 is arranged at the inner circumferential portion of the rotary shaft 4, heat insulation efficiency of the rotary shaft 4 is increased. Accordingly, the external heat (from the atmospheric portion 14) is restricted from being transferred via the rotary shaft 4 to the accommodating chamber 60 under low temperature.

Figure 7:
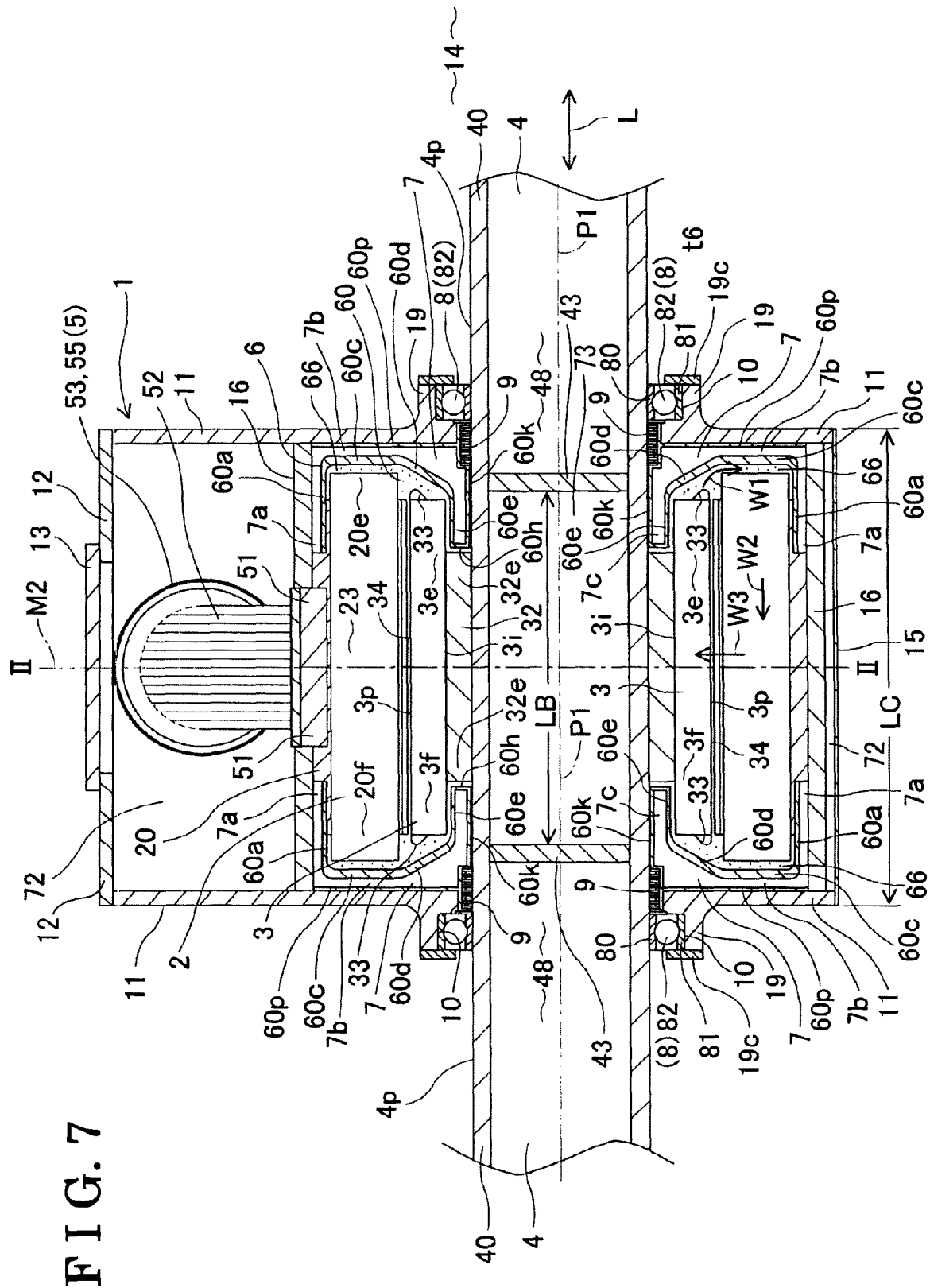
FIG. 7 is a cross-sectional view of the superconducting rotating electrical machine according to a fifth embodiment disclosed here, cut along the axial line of the rotary shaft.

Further, as shown in FIG. 7, the axial length LB of the third vacuum heat insulation chamber 73 in the axial length (direction indicted by an arrow L) is designed to be shorter than the axial length LC of the base member 1 in the axial length. Accordingly, the Ferrofluidic seals 9 are arranged so as to face an inner hollow space 48 of the rotary shaft 4, which is exposed to the room temperature. Further, each of the Ferrofluidic seals 9 is positioned at a further exterior side of each of the partition walls 43, 43 in the axial direction indicated by the arrow L. Accordingly, an inner circumferential portion of the Ferrofluidic seal 9 is at the room temperature (in the ambient atmosphere at the room temperature). Consequently, even when the accommodating chamber 60 is maintained in the low temperature state such as the extremely low temperature state, the Ferrofluidic seal 9 is prevented from being excessively cooled. As a result, the lubricating property and the sealing performance of the Ferrofluidic seal 9 are appropriately maintained for a long period of time. In addition, the gas cooling medium 66 filled in the accommodating chamber 60 is prevented from leaking therefrom to the atmospheric portion 14.

Figure 8:
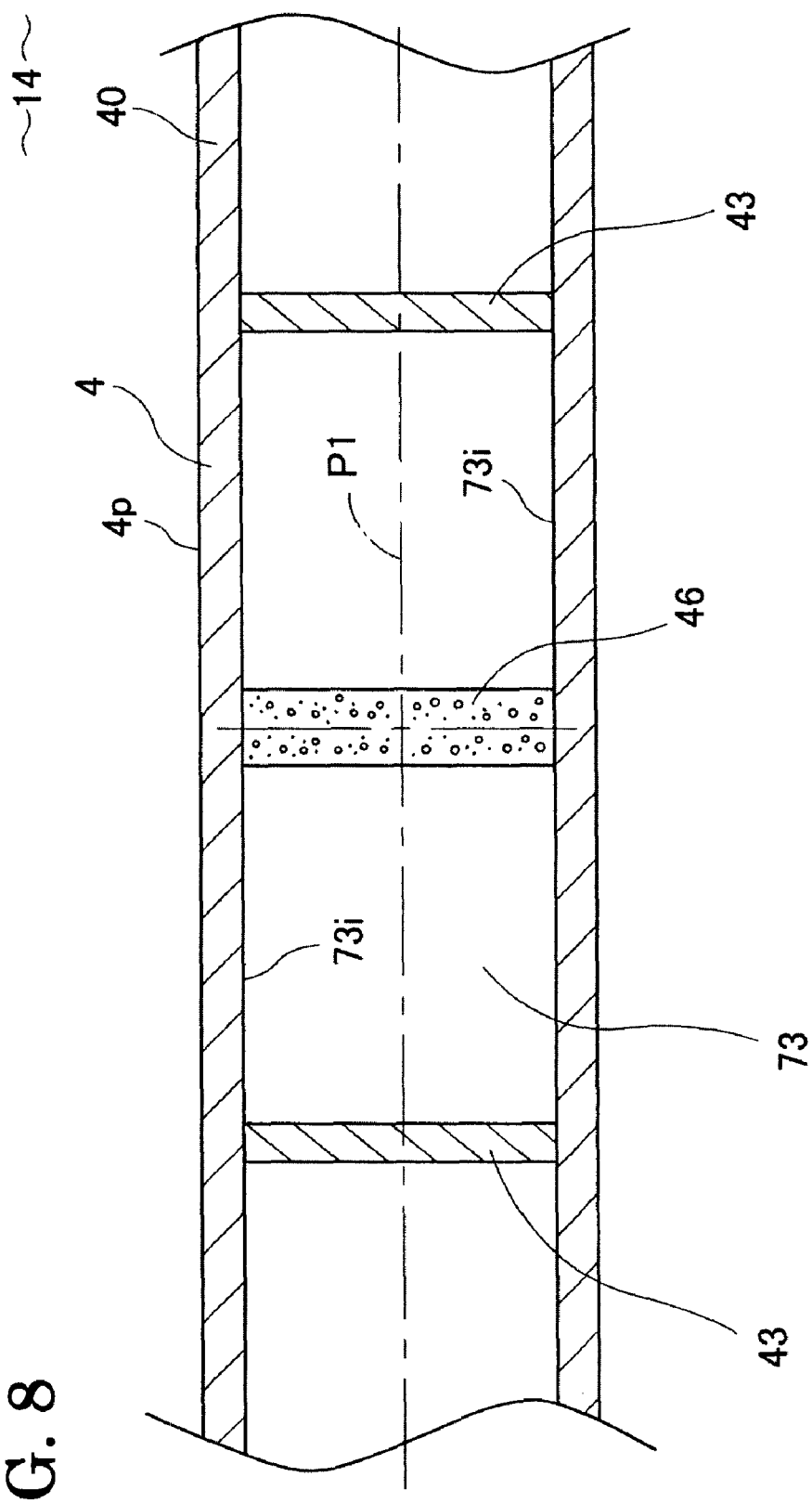
FIG. 8 is a cross-sectional view illustrating an inner circumferential portion of the rotary shaft of the superconducting rotating electrical machine according to a sixth embodiment.

A sixth embodiment of the superconducting rotating electrical machine will be described below with reference to FIG. 8. The sixth embodiment has substantially the same configuration and effects as the aforementioned fourth and fifth embodiments. Differences from the fourth and fifth embodiments will be mainly explained as follows. The third vacuum heat insulation chamber 73 under the airtight condition is arranged at the inner circumferential portion of the rotor 4; therefore, the external heat is restricted from being transmitted via the rotary shaft 4 to the accommodating chamber 60 and the rotor 3 that are maintained in the low temperature. A gas absorbing agent 46 is provided within the third vacuum heat insulation chamber 73. In particular, the gas absorbing agent 46 is attached in a tape shape to an inner circumferential surface 73i forming the third vacuum heat insulation chamber 73, thereby being supported thereon. Accordingly, the third heat vacuum insulation chamber 73 is maintained in a high vacuum state and in a vacuum heat insulation state for a long period of time. A gas absorbing agent having a high absorbability under low temperature is appropriate for the gas absorbing agent 46. The gas absorbing agent 46 is, for example, a molecular sieve, an activated charcoal, an oxygen absorbing agent, and the like. The molecular sieve includes a zeolite-base material that has a high absorbability. According to other embodiments, as long as the rotary shaft 4 is configured to include the third heat vacuum insulation chamber 73, the gas absorbing agent 26 may be applied. The gas absorbing agent 46 is desirably uniformly attached to the inner circumferential surface 73i defining the third vacuum heat insulation chamber 73 in order to appropriately align the central axis P1 of the rotary shaft 4. Additionally, the gas absorbing agent 46 formed in a powdered state or a particle state may be filled into the third vacuum heat insulation chamber 73 according to needs. Further alternatively, the gas absorbing agent 46 may be provided in the vacuum heat insulation chamber 7 and/or the second vacuum heat insulation chamber 72.

Figure 9:
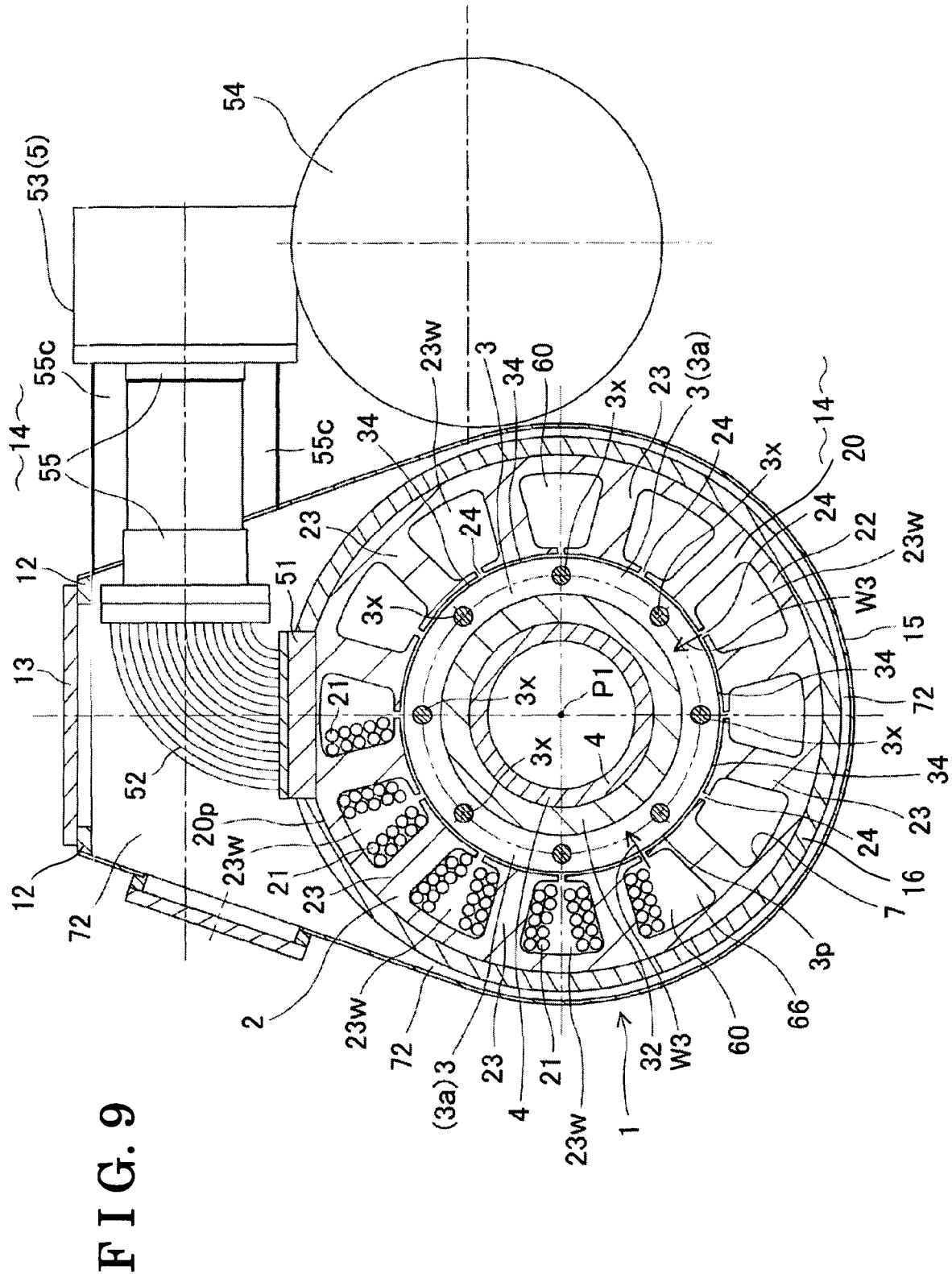
FIG. 9 is a cross-sectional view of the superconducting rotating electrical machine according to a seventh embodiment, cut along the axial line of the rotary shaft.

A seventh embodiment of the superconducting rotating electrical machine will be explained as follows with reference to FIG. 9. The seventh embodiment is an example where the superconducting rotating electrical machine is applied to the generator. The seventh embodiment has substantially the same configuration and effects as the aforementioned first, second, third, fourth, fifth, and sixth embodiments. Differences from the first, second, third, fourth, fifth, and sixth embodiments will de mainly described as follows. Since the superconducting rotating electrical machine is applied to the generator, a plurality of permanent magnets 3x is arranged circumferentially at intervals from one another on the rotor 3. Positive and negative poles of the permanent magnets 3x are circumferentially arranged one after the other. Each of the permanent magnets 3x is formed by a superconducting bulk magnet and maintained in the low temperature state that is equal to or lower than a critical temperature of the superconducting bulk magnet. When the rotor shaft 4 is driven by a power source and rotated around the central axis P1; thereby, the permanent magnets 3x are rotated along with the rotor 3. As a result, the induced current is generated at the wound portions 21 of the stator 2. The induced current generated at the wound portions 21 is converted by the inverter to the alternating current.

The superconducting bulk magnet is a superconductor formed in a bulk that is referred to as a superconducting bulk. After being melt, a superconducting material is solidified; thereby, the superconducting bulk is obtained. In the case where a superconducting bulk synthesized by means of an appropriate composition control is magnetized in a magnetic field, the small-sized superconducting bulk retains a strong magnetic field indicated by the unit Tesla (T). For example, the superconductor is magnetized to be a superconducting bulk material accordingly. In addition, the aforementioned techniques applied to the superconducting motor may be applied to the generator. The generator is further configured so as to have the configurations and effects specially applied in the aforementioned embodiments.

According to the aforementioned embodiments, the Ferrofluidic seal 9 in which the magnetic fluid is utilized is arranged between the outer circumferential portion 4p of the rotary shaft 4 and the shaft hole 10 of the base member 1. Alternatively, a seal portion formed by a general organic or non-organic seal material may be applied instead of the Ferrofluidic seal 9. In the superconducting rotating electrical machine according to the embodiments, the rotor 3 is arranged radially inward from the inner circumferential portion of the stator 2. Alternatively, the rotor 3 may be arranged radially outward from the outer circumferential portion of the stator 2. Further, the baring 8 includes the inner race 80 having the ring shape, the outer race 81 having the ring shape, and the rolling elements 82. Alternatively, the bearing 8 may include an inner race and rolling elements or an outer race and rolling elements. In addition, the bearing 8 is not limited to a rolling bearing. Alternatively, the bearing 8 may be a cylindrical roller bearing, a taper-roller bearing, or a slide bearing. Furthermore, the plurality of wing portions 33 is arranged at the first and second axial ends 3e and 3f of the rotor 3. Alternatively, the wing portions 33 may be arranged at the rotary shaft 4. In addition, when the gas cooling medium 66 is circulated by the rotation of the rotor 3, the wing portions 33 are potentially excluded. Moreover, the gas cooling medium 66 may be replaced by the air. Additionally, although the liquid cooling medium has the viscosity slightly higher than the viscosity of the gas cooling medium 66, the liquid cooling medium may be applied instead of the gas cooling medium 66.

The superconducting rotating electrical machine according to the aforementioned embodiments is applied to the induction motor that is configured so that the induced current is generated at the stator 2 to thereby rotate the rotor 3. Alternatively, the superconducting rotating electrical machine according to the embodiments may be applied to a motor including a rotor to which a magnet (superconducting magnet) formed by a superconducting material is attached. In addition, the superconducting rotating electrical machine is not limited to the induction motor and may be applied to the generator including a rotor to which a magnet portion formed by the superconducting material such as the superconducting bulk magnet is attached.

The superconducting rotating electrical machine is not limited to the aforementioned embodiments illustrated in the accompanying drawings and may be modified according to needs as long as not departing from the intended purpose of the superconducting rotating electrical machine of the embodiments.

The superconducting rotating electrical machine according to the aforementioned embodiments is applied to a superconducting motor or a superconducting rotating electrical machine that is used for driving a vehicle, in a stationary state, for an industrial purpose, and the like As described above, according to the aforementioned embodiments, the bearings 8 supporting the rotary shaft 4 are arranged at a portion of the base member 1 where the accommodating chamber 60 is prevented from being provided and which is exposed to the ambient atmosphere including the atmospheric air. Accordingly, the bearings 8 are prevented from being maintained in the low temperature state such as the extremely low temperature state when the superconducting motor or generator is in operation. Consequently, the bearings 8 are prevented from being excessively cooled and appropriately supported on the rotor shaft 4 for a long period of time. As a result, the rotary shaft 4 supported by the bearings 8 is favorably maintained for a long period of time.

According to the aforementioned embodiments, the superconducting rotating electrical machine further includes the Ferrofluidic seal 9 at the outer circumferential portion 4p of the rotary shaft 4 to prevent the gas cooling medium 66 filled in the accommodating chamber 60 from leaking therefrom.

Accordingly, the gas cooling medium 66 is prevented from leaking from the accommodating chamber 60.

According to the aforementioned embodiments, the seal portion 9 is the Ferrofluidic seal 9.

According to the aforementioned embodiments, the Ferrofluidic seal 9 is arranged between the accommodating chamber 60 and the bearing 8.

According to the aforementioned embodiments, the Ferrofluidic seal 9 is arranged between the vacuum heat insulation chamber 7 and the bearing 8.

According to the aforementioned embodiments, the Ferrofluidic seal 9 is located next to the bearing 8.

Accordingly, the bearing 8 prevents the misalignment of the rotary shaft 4, therefore elongating the life span of the Ferrofluidic seal 9 arranged adjacent to the bearing 8.

According to the aforementioned embodiments, the base member 1 includes the facing walls 11, 11 facing each other and each having the shaft hole 10 for the rotary shaft 4. The Ferrofluidic seal 9 is provided in the shaft hole 10.

According to the aforementioned embodiments, each of the facing walls 11, 11 is positioned adjacent to the vacuum heat insulation chamber 7. The Ferrofluidic seal 9 is positioned to be in contact with both the vacuum heat insulation chamber 7 and the facing wall 11.

According to the aforementioned embodiments, at least one of the rotor 3 and the rotary shaft 4 includes the wing mechanism having the wing portion 33 and increasing cooling efficiency by circulating the gas cooling medium 66 of the accommodating chamber 60 therein.

Accordingly, the wing mechanism allows the rotor 3 to be further cooled.

According to the aforementioned embodiments, the stator 2 includes the magnetic permeable core 20 formed by the magnetic permeable material that surrounds the rotor shaft 4 and having the cylindrical shape. The low temperature container 6 includes the outer circumferential wall 60a, the covering wall 60c, and the inclined wall 60d. The outer circumferential wall 60a is arranged radially outward from the magnetic permeable core 20 while surrounding the rotary shaft 4. The covering wall 60c connects to the outer circumferential wall 60a and covers the first and second axial ends 20e and 20f of the magnetic permeable core 20. The inclined wall 60d is formed in the circular cone extending radially inward from the covering wall 60c. The wing portion 33 of the wing mechanism is formed to face the inclined wall 60d of the low temperature container 6.

According to the aforementioned embodiments, the low temperature container 6 includes the tubular sealing portion 60k facing the outer circumferential portion 4p of the rotary shaft 4 in a condition where the clearance 63 is defined between the low temperature container 6 and the outer circumferential portion 4p. The tubular sealing portion 60k extends along the axial direction of the rotary shaft 4.

According to the aforementioned embodiments, the tubular sealing portion 60k is arranged adjacent to the Ferrofluidic seal 9.

Accordingly, the sealing performance of the tubular sealing portion 60k is appropriately secured while the rotary performance of the rotary shaft 4 is secured.

According to the aforementioned third embodiment, the superconducting rotating electrical machine further includes the gas cooling medium charge-discharge portion 100 charging and discharging the gas cooling medium 66 to and from the accommodating chamber 60 depending on the pressure variations of the gas cooling medium 66.

Accordingly, the gas cooling medium 66 may be supplied by the gas cooling medium charge-discharge portion 100 according to need, thereby further cooling the rotor 3.

According to the aforementioned fourth embodiment, the rotary shaft 4 is the hollow shaft. The third vacuum heat insulation chamber 73 and the pair of partition walls 43, 43 are arranged at the inner circumferential portion of the rotary shaft 4. The third vacuum heat insulation chamber 73 is positioned to face the rotor 3 in the axial direction of the rotary shaft 4. The partition walls 43, 43 section the inner circumferential portion of the rotary shaft to define the third vacuum heat insulation chamber 73.

According to the aforementioned fourth embodiment, the axial length LB of the third vacuum heat insulation chamber 73 in the axial direction of the rotary shaft 4 is set to be longer than the axial length LC of the base member 1.

According to the aforementioned sixth embodiment, the gas absorbing agent 46 is provided within the third vacuum heat insulation chamber 73.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A superconducting rotating electrical machine configuring a motor or generator, comprising:
   a base member;
   a stator supported by the base member;
   a rotor rotatably provided relative to the stator and including a superconducting material;
   a rotary shaft supporting the rotor;
   a cooling portion cooling the stator;
   a low temperature container forming an accommodating chamber accommodating the stator, the rotor, and a coolant, the accommodating chamber being arranged within the base member;
   a vacuum heat insulation chamber arranged at an outer side of the accommodating chamber and thermally insulating the accommodating chamber with vacuum; and
   a bearing positioned at a portion of the base member where the accommodating chamber is prevented from being provided and which is exposed to an ambient atmosphere including atmospheric air, the bearing rotatably supporting the rotary shaft.

2. The superconducting rotating electrical machine according to claim 1, further comprising a seal portion at an outer circumferential portion of the rotary shaft to prevent the coolant filled in the accommodating chamber from leaking therefrom.

3. The superconducting rotating electrical machine according to claim 2, wherein the seal portion is a Ferrofluidic seal.

4. The superconducting rotating electrical machine according to claim 2, wherein the seal portion is arranged between the accommodating chamber and the bearing.

5. The superconducting rotating electrical machine according to claim 2, wherein the seal portion is arranged between the vacuum heat insulation chamber and the bearing.

6. The superconducting rotating electrical machine according to claim 2, wherein the seal port on is located next to the bearing.

7. The superconducting rotating electrical machine according to claim 2, wherein the base member includes facing walls facing each other and each having a shaft hole for the rotary shaft, and the seal portion is provided in the shaft hole.

8. The superconducting rotating electrical machine according to claim 7, wherein each of the facing walls is positioned adjacent to the vacuum heat insulation chamber, and the seal portion is positioned to be in contact with both the vacuum heat insulation chamber and the facing wall.

9. The superconducting rotating electrical machine according to claim 2, wherein at least one of the rotor and the rotary shaft includes a wing mechanism having a wing portion and increasing cooling efficiency by circulating the coolant of the accommodating chamber therein.

10. The superconducting rotating electrical machine according to claim 9, wherein the stator includes a magnetic permeable core formed by a magnetic permeable material that surrounds the rotor shaft and having a cylindrical shape,
   wherein the low temperature container includes an outer circumferential wall, a covering wall, and an inclined wall, the outer circumferential wall being arranged radially outward from the magnetic permeable core and surrounding the rotary shaft, the covering wall connecting to the outer circumferential wall and covering first and second axial ends of the magnetic permeable core, the inclined wall formed in a circular cone extending radially inward from the covering wall, and wherein the wing portion of the wing mechanism is formed to face the inclined wall of the low temperature container.

11. The superconducting rotating electrical machine according to claim 10, wherein the low temperature container includes a tubular sealing portion facing the outer circumferential portion of the rotary shaft in a condition where a clearance is defined between the low temperature container and the outer circumferential portion, the tubular sealing portion extending along an axial direction of the rotary shaft.

12. The superconducting rotating electrical machine according to claim 11, wherein the tubular sealing portion is arranged adjacent to the seal portion.

13. The superconducting rotating electrical machine according to claim 1, further comprising a coolant charge-discharge portion charging and discharging the coolant to and from the accommodating chamber depending on pressure variations of the coolant.

14. The superconducting rotating electrical machine according to claim 1, wherein the rotary shaft is a hollow shaft, and a rotary-shaft vacuum heat insulation chamber and a pair of partition walls are arranged at an inner circumferential portion of the rotary shaft, the rotary-shaft vacuum heat insulation chamber being positioned to face the rotor in the axial direction of the rotary shaft, the partition walls sectioning the inner circumferential portion of the rotary shaft to define the rotary-shaft vacuum heat insulation chamber.

15. The superconducting rotating electrical machine according to claim 14, wherein an axial length of the rotary-shaft vacuum heat insulation chamber in the axial direction of the rotary shaft is set to be longer than an axial length of the base member.

16. The superconducting rotating electrical machine according to claim 14, wherein a gas absorbing agent is provided within the rotary-shaft vacuum heat insulation chamber.

17. A superconducting rotating electrical machine configuring a motor or generator, comprising:
 a base member;
 a stator supported by the base member;
 a rotor rotatably provided relative to the stator and including a superconducting material;
 a rotary shaft supporting the rotor;
 a cooling portion cooling the stator;
 a low temperature container forming an accommodating chamber accommodating the stator, the rotor, and a cooling medium;
 a vacuum heat insulation chamber arranged at an outer side of the accommodating chamber and thermally insulating the accommodating chamber with vacuum; and
 a Ferrofluidic seal positioned between an outer circumferential portion of the rotary shaft and the base member.

18. The superconducting rotating electrical machine according to claim 17, wherein the base member includes facing walls facing each other and each having a shaft hole for the rotary shaft, and the Ferrofluidic seal is provided in the shaft hole.

19. The superconducting rotating electrical machine according to claim 18, wherein each of the facing walls is positioned adjacent to the vacuum heat insulation chamber, and the Ferrofluidic seal is positioned to be in contact with both the vacuum heat insulation chamber and the facing wall.

20. A superconducting rotating electrical machine configuring a motor or generator, comprising:
 a base member;
 a stator supported by the base member;
 a rotor rotatably provided relative to the stator and including a superconducting material;
 a rotary shaft supporting the rotor;
 a cooling portion cooling the stator;
 a low temperature container forming an accommodating chamber accommodating the stator, the rotor, and a cooling medium, the accommodating chamber being arranged within the base member;
 a vacuum heat insulation chamber arranged at an outer side of the accommodating chamber and thermally insulating the accommodating chamber with vacuum;
 a bearing positioned at a portion of the base member where the accommodating chamber is prevented from being provided and which is exposed to an ambient atmosphere including atmospheric air, the bearing rotatably supporting the rotary shaft; and
 a Ferrofluidic seal positioned between an outer circumferential portion of the rotary shaft and the base member,
 the base member including facing walls facing each other and each having a shaft hole for the rotary shaft and positioned adjacent to the vacuum heat insulation chamber,
 wherein the Ferrofluidic seal is located next to the bearing between the accommodating chamber and the bearing and formed to be in contact with both the vacuum heat insulation chamber and the facing wall.

* * * * *